United States Patent
Gupta et al.

(10) Patent No.: US 7,304,954 B1
(45) Date of Patent: *Dec. 4, 2007

(54) IDENTIFICATION OF NON-PERFORMING SWITCHES IN THE PATH OF A CONNECTION

(75) Inventors: Himanshu Gupta, Bangalore (IN); Srikar B. S., Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 1010 days.

This patent is subject to a terminal disclaimer.

(21) Appl. No.: 10/335,107

(22) Filed: Dec. 31, 2002

(51) Int. Cl.
*G06F 11/00* (2006.01)

(52) U.S. Cl. .............. 370/236.1; 370/236.2; 370/241.1; 370/242; 370/248; 709/45; 709/46

(58) Field of Classification Search ........ 370/241, 370/248, 252, 254, 236.1, 236.2; 714/45, 714/46, 48
See application file for complete search history.

(56) References Cited

U.S. PATENT DOCUMENTS

| | | | | |
|---|---|---|---|---|
| 5,901,141 A | * | 5/1999 | Gruber et al. | 370/248 |
| 6,298,043 B1 | * | 10/2001 | Mauger et al. | 370/248 |
| 6,643,267 B1 | * | 11/2003 | Karia et al. | 370/252 |
| 2004/0008643 A1 | * | 1/2004 | Guturu et al. | 370/329 |

OTHER PUBLICATIONS

The ATM forum technical committee: PNNI addendum for path and connection trace version 1.0 af-cs-0141.000, Mar. 2000.*
"PNNI Addendum for Path and Connection Trace Version 1.0", The ATM Forum Technical Committee, af-cs-0141.000, pp. 1-114 (Mar. 2000).

* cited by examiner

*Primary Examiner*—Chi Pham
*Assistant Examiner*—Shick Hom
(74) *Attorney, Agent, or Firm*—Thelen Reid Brown Raysman & Steiner LLP; David B. Ritchie (57) ABSTRACT

A connection-trace standard is used to collect cell-drop information from switches in the path of a network connection in order to identify non-performing switches. Special codes may be inserted in the vendor specific fields of the trace transit list information elements of specified messages. These codes indicate that that cell-drop information is to be collected along with the trace. Switches that carry the connection may then read the codes in the messages and populate appropriate information into connection-trace messages. Eventually, cell-drop information from each of the relevant switches may reach the source of the trace. This information may then be accessed through a Management Information Base (MIB) or via command-line interface commands. This automates and improves the speed of identifying non-performing switches.

52 Claims, 6 Drawing Sheets

FIG. 1

PRIOR ART

IDENTIFICATION OF NON-PERFORMING SWITCHES IN THE PATH OF A CONNECTION

FIELD OF THE INVENTION

The present invention relates to the field of Asynchronous Transfer Mode (ATM) networks. More specifically, the present invention relates to a method, apparatus, and program storage device for automatically identifying non-performing switches in an ATM connection.

BACKGROUND OF THE INVENTION

Users are often offered different types of network services from service providers (ISPs). These users typically will opt for the service or services that matches their perceived use of the connection. When users opt for a higher degree of service, they expect a higher throughput of data. However, due to defects in equipment or congestion in the network, it is possible for users to get a lower than Service Level Agreement (SLA) throughput. An SLA is a contract between a service provider and a user that specifies the level of service that is expected during its term. Since this is unacceptable to users, ISPs need facilities to identify the problematic switches in the user's connection, so that problems with the connection can be remedied quickly.

Presently, ISPs need to log into each and every switch to find out if there have been cell drops for the specific connection. Cell drop information would be helpful in determining whether specific switches are the source of the problem. A standard connection-trace command may be utilized to identify the switches that the connection traverses, and to identify the connection-id on each switch. Then cell-drop information may be queried from each switch separately. This may be accomplished in two ways. First, the administrator can log into each of the switches and use the command-line interface on each switch to see the number of cells dropped by the specific connection. Second, since cell-drop information is maintained in Management Information Bases (MIBs), the administrator can query the MIBs of each switch separately to find out the cell-drop information. Either approach one involve a laborious process, especially if the connection spans many switches. Moreover, if the connection spans networks where the ISP offering the service does not have access to the switches of MIBs, the process of determining problematic switches becomes impossible.

Figure 1:
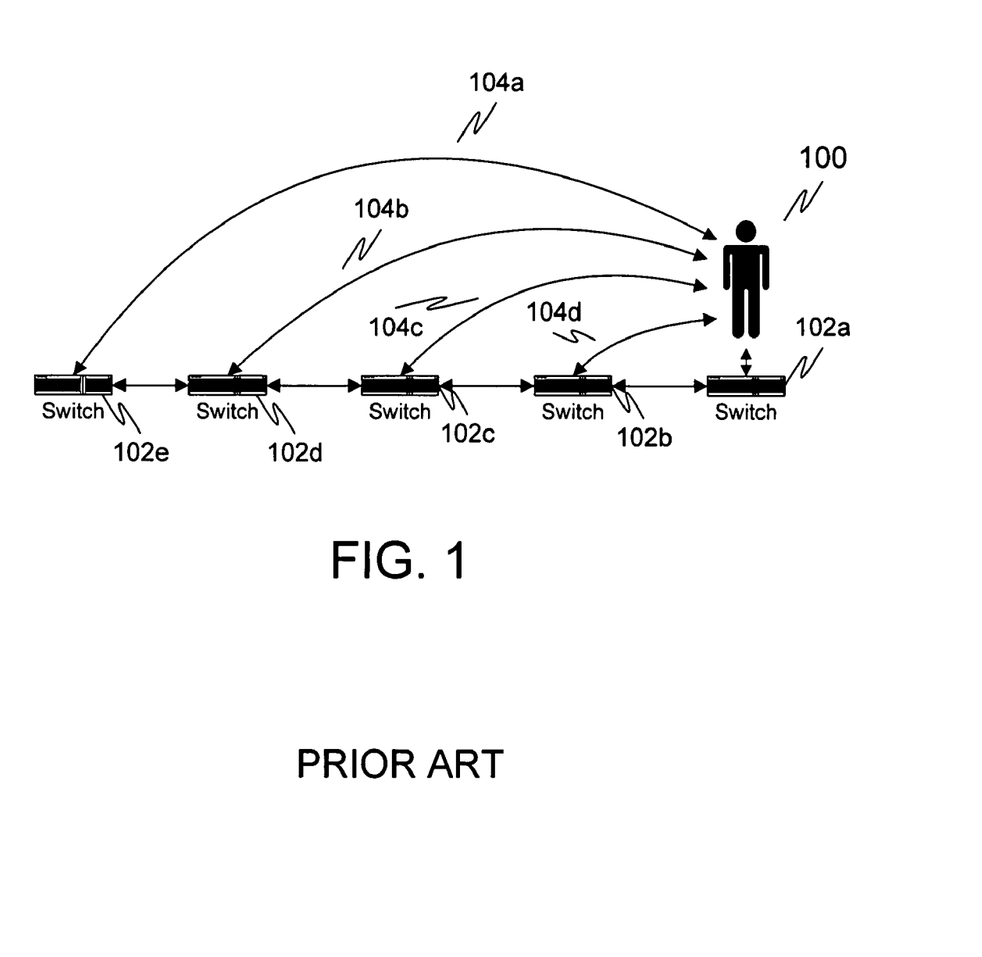
FIG. 1 is a diagram illustrating the typical cell-drop information gathering process.

FIG. 1 is a diagram illustrating the typical cell-drop information gathering process. In order for a user 100 to obtain cell-drop information for a connection that spans from switch 102a through switch 102e, he must make individual log-in attempts 104a-104d to each switch 102b-102e. What is needed is a solution that allows an ISP to quickly and automatically identify problematic switches.

BRIEF DESCRIPTION

A connection-trace standard is used to collect cell-drop information from switches in the path of a network connection in order to identify non-performing switches. Special codes may be inserted in the vendor specific fields of the trace transit list information elements of specified messages. These codes indicate that that cell-drop information is to be collected along with the trace. Switches that carry the connection may then read the codes in the messages and populate appropriate information into connection-trace messages. Eventually, cell-drop information from each of the relevant switches may reach the source of the trace. This information may then be accessed through a Management Information Base (MIB) or via command-line interface commands. This automates and improves the speed of identifying non-performing switches.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

in accordance with one embodiment of the present invention, the components, process steps, and/or data structures may be implemented using various types of operating systems, computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention may be used in a network of ATM switches. However, one of ordinary skill in the art will recognize that the present invention may be easily modified to be compatible with other types of network switches as well, and the present invention should not be read as being limited to ATM switches.

The ATM Path and Connection Trace Version 1.0 standard (as defined by af-cs-0141.000, March 2000, published by the ATM Forum Technical Committee) contains a facility to add vendor-specific information to a Trace-Transit-List (TTL). The present invention piggy-backs on this standard to insert special codes in the vendor specific fields of the Trace Transit List Information elements of specified messages. Switches that carry the connection may then read the codes in the messages and populate appropriate information in a response. The collected responses accumulated from all the switches that carry the connection may be stored in a specialized Management Information base (MIB). This information may then be accessed by Network Management Systems or Command Line Interface commands.

For example, when network response time delays are reported by a user, the present invention allows the network administrator to query cell drops from all of the switches carrying the connection. Switches with a specified connection interpret the code for cell drops and insert the cell drop value for this connection in the message. The terminating switch may then create a response message and return the insertions of the switches along the request path to the originator. On receiving the response, the originating switch then may interpret the return values and populate the MIB accordingly.

Figure 2:
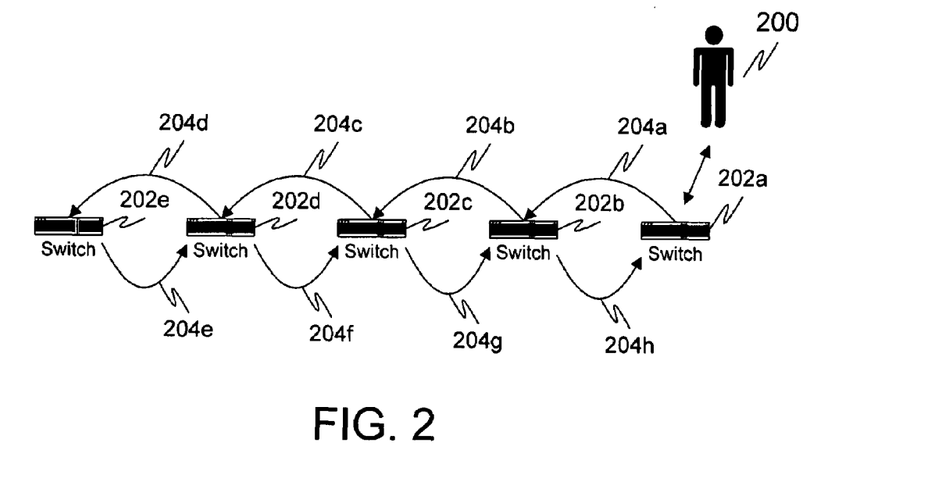
FIG. 2 is a diagram illustrating the retrieval of cell-drop information from switches of a network of switches connection in accordance with an embodiment of the present invention.

FIG. 2 is a diagram illustrating the retrieval of cell-drop information from switches of a network of switches connection in accordance with an embodiment of the present invention. User 200 need only initiate a connection trace on switch 202a, which is passed 204a to switch 202b. Switch 202b may then add its cell drop information, and pass 204b the connection trace to switch 202c. This continues until the destination switch 202e of the connection is reached. At that point, the destination switch 202e may take the information in the connection trace message, and place it in a connection trace acknowledge message. This may then be passed 204e to switch 202d, and so on, until the original source switch 202a receives the connection trace acknowledge. The present invention, therefore, automates the query of all switches along the path of the connection. Without this facility, the network administrator would have to query each switch to get the performance information and the next hop where the specific connection is carried. Thus, the present invention also greatly reduces the debug and analysis time.

Specific implementations of the present invention will now be discussed in more detail. One of ordinary skill in the art will recognize, however, that other implementations are possible.

A connection-trace is used to trace existing switched-connections through a Private Network-to-Network Interface (PNNI) network. A switched connection may be established using normal signaling procedures. Once a connection is established, a connection-trace can be initiated to trace this connection through the PNNI network the connection traverses. Trace information can be obtained only about that part of the connection which lies within a PNNI network.

Connection-trace provides information about the switches and links traversed by the connection. The following details can be obtained:

a) The switch-id of each switch.
    b) The port-id (only one port-id for each switch, but both port-id's for the end-points)
    c) The Virtual Path Identifier-Virtual Channel Identifier (VPI-VCI) value on each link (optional)
    d) The call-reference value on each link (optional)
    e) For Point-to-Multi-Point (P2MP) connections, the end-point reference value on each link (optional)
    f) The number of cell-drops in each direction, as introduced by the present invention (optional)

A Trace-Connection (TC) signaling message and a Trace-Connection-Acknowledge (TCAck) signaling message may be utilized to accomplish connection tracing. Furthermore, a signaling information element, the Trace Transit List (TTL), may be used for connection tracing as well. The TTL carries all the trace information.

When a connection-trace is triggered, the trace-source-switch originates a Trace-Connection (TC) message. This message contains the TTL information element. This information element (IE) is used to collect trace-information from each switch, so the IE keeps increasing in size as the trace progresses. Whether tracing is to be done for VPI-VCI values, call-reference-values and/or cell-drop-value, is determined by flags in the TTL IE.

The switch receiving this message adds its own trace-information to the TTL IE, and forwards this message on the interface having the other leg of the connection. This goes on until the message reaches the trace-destination-switch, which adds its own information to the TTL.

The trace-destination-switch may then put this TTL (which contains all the trace information) into a TCAck message, and send this message back towards the trace-source switch. Every switch receiving the TCAck message simply forwards the message towards the trace-source-switch without doing any further processing.

A connection-trace is said to have "completed" when the trace-source-switch receives a TCAck message in reply to the TC message it had sent. The source-switch extracts the result information from the TTL IE of the TCAck message and keeps it stored. Two timers are associated with every connection-trace initiated at a switch:

a) Fail-timer—When the TC message is originated, the trace-source-switch starts this timer. This timer is stopped when the TCAck message is received. The expiration of this timer indicates that the connection-trace has failed. If a TCAck message is received by the trace-source-switch after the expiration of this timer, then the TCAck is discarded.

b) Age-timer—This timer controls how long the switch shall maintain information about a particular trace. In one implementation of the present invention, the timer shall be started either when the TCAck message for a connection-trace is received, or when the fail-timer for the trace expires (whichever occurs earlier). As long as the age-timer for a particular trace is running, the switch shall maintain information about that trace. When this timer expires, all information about the corresponding trace is deleted.

From the functional perspective, there are four main aspects to be considered for connection-trace:

a) Initiating a connection-trace: Triggering a connection-trace at a switch results in the origination of the TC message from the switch.

b) Processing of TC and TCAck messages: This involves the creating and interpreting of these messages, and filling up the TTL IE with the required trace information.

c) Storing information about traces: The number of connection-traces for which information will be maintained at a switch will have to be restricted.

d) Timer management: An age-timer and a fail-timer are associated with each connection-trace initiated at a switch. The fail-timer is related to the signaling procedures, while the age-timer affects the database of stored trace information.

The ATM-TRACE-MIB as defined as part of the connection trace specification already provides a detailed interface to connection-trace. It clearly defines the information that is required to initiate the trace, and also the information that is returned as the result of the trace. For every trace, all this information will be stored in a database in the switch.

Additionally, up to 8 bytes of vendor-specific information can be added to the TTL IE at each hop. As will be seen later, in accordance with an embodiment of the present invention, this may be used to collect the cell-drop information from each switch in the path of a VC.

The switch at which a connection-trace is initiated may be called the trace-source-switch for that particular trace. Requests from the user will be validated and used to initiate a connection trace as follows:

1. Pass Request to Signaling

The validated request will be passed onto signaling, which will create and transmit the TC message. This will be done synchronously, i.e. all the processing from the time of reception of the request until the sending-out of the TC message will be done at one shot. Signaling may involve preparing the TTL IE for the message, putting the TTL IE into a TC message, and sending out the TC message. If any failure is encountered in sending the TC message, then this request may be discarded, and no further processing shall be done.

Additionally, the interface on which the TC message for this trace is to be sent out shall be determined.

2. Add Request to the Database

The request is added to the database only after the TC message has been sent out successfully.

3. Start the Fail-Timer

Once signaling indicates that the TC message has been successfully sent out, the fail-timer for this request shall be started.

Processing the TC and TCAck messages may be handled by a call setup state-machine. However, it is not necessary that such a state-machine be involved. For connection-traces, the connection/party being traced should already be established and in the active state. No state-machine is necessary for connection-trace procedures, thus, apart from the trace-source-switch (which has a fail-timer running), no other switch needs to maintain any state information related to connection-trace. The information gathered by a connection-trace at a switch also does not warrant any involvement of a call setup-state machine.

In most error scenarios in connection-trace, the switch at which the error occurs does nothing, i.e., it does not send any notification to the switch from which the TC message was received. A significant implication of a stateless implementation at all intermediate switches is that if a connection-trace error does occur on some intermediate switch, then none of the other intermediate switches will be able to detect this failure. The trace-source-switch will get to know that the trace has failed only on the expiry of the fail-timer.

On receiving a TC message, a switch needs to add trace-information to the received TTL IE. Then, if this switch is the trace-destination-switch for this trace, it should put the modified TTL IE into a TCAck message and send it back on the interface where the TC message arrived; if this switch is not the trace-destination-switch then it should progress the TC message along the path of the connection/party being traced.

On receiving the TCAck message, the processing is much simpler. A switch, which is not the trace-source-switch for this trace, just needs to forward the message in the direction of the trace-source-switch. The trace-source-switch then parses the TTL IE of the message, and stores the results in its database.

A record is created at the switch, for every valid connection-trace request received by it. The record is deleted upon the expiration of the age-timer associated with the record. There is no point in maintaining trace-information about a connection/party that has been deleted. Thus, when a connection/party is deleted, any stored trace-information corresponding to it will also be deleted.

By utilizing the vendor-specific-information field provided in the TTL IE, a connection-trace may be initiated on a switch to conveniently find out the number of drops on each switch in the path of the connection/party. This allows the administrator to compare the cell-drop-counts for the various hops to locate the non-performing switch.

When the user indicates that cell-drop information is to be collected with the connection-trace, the trace-source switch may insert a Vendor-Specific-Information (VSI) field in the TTL IE. This VSI field may contain a special code that indicates that cell-drop information is to be collected by the trace.

When a switch receives a TC message, it may examine the information added to the TTL IE by the trace-source switch. If this switch finds that the vendor-specific information field indicates that cell drops on each hop are to be traced, then this switch adds the cell-drop information for this VC to the TTL IE (by using another vendor-specific information field). Otherwise, the switch may proceed normally.

The trace-source-switch may insert the VSI-field with the special code right at the beginning of the TTL IE. In one embodiment of the present invention, the VSI field is inserted right after Octet 6 and before Octet-group 7 of the TTL IE. The advantage of placing the VSI-field here is that switches receiving the TC message need minimal parsing to determine that cell-drop information is be collected.

The trace-source-switch may also insert its own cell-drop information into the TTL EE. This information may be inserted in a second VSI field. This VSI field may be added right after octet-group 12 in the TTL IE.

When downstream switches add their cell-drop information to the TTI IE, they too may place their VSI-field right after their own octet-group 12.

On each relevant switch for a particular VC, there may be two cell-drop counters, one for each direction of traffic. In an embodiment of the present invention, the cell-drop values for the direction of the trace should be added first. If cell-drop information is for some reason unavailable, then a dummy value may be added to the VSI-field to indicate this.

In one embodiment of the present invention, 32-bit counters are maintained for the cell drops on each (relevant) switch. It is therefore important that the entire 32-bit value be retrieved, otherwise some information may be lost. Thus, the 8-byte vendor-specific information field permitted to be added at each hop is perfect to hold the cell-drop values in both directions. If two 4-byte values are used per hop (one in each direction), that would adequately describe the entire 32-value for each direction. However, that can create a problem at the trace-source-switch, where one byte has been reserved to indicate that "Cell drops on each hop" are to be traced.

One solution is to have the trace-source-switch refrain from adding its cell-drop information to the TTL IE of the TC. Since it will eventually get the TTL IE back anyway as a part of the TCAck message, it can simply keep track of its own cell-drop information without placing it in the TTL IE. The drawback of this solution is that it does not keep with the general trend of connection-traces, where the source-switch also adds all the required information to the TC message.

The other solution would be to simply use 3-byte values at each hop rather than 4. This has the potential to lose some of the cell-drop information, but 3-bytes worth of information still can indicate significant problems with dropped cells.

The advantage of using the Vendor-Specific information field is that it works with the standard and is completely interoperable with other standard implementations of connection-trace. Switches that do not support the cell-drop connection trace will continue to function normally and perform their standard trace steps, while ignoring the VSI fields.

A new MIB may also be provided for supporting proprietary extensions to the connection-trace feature. This MIB allow the administrator to initiate the connection-trace through SNMP and specify that he wants to collect cell-drop information. The MIB may also allow the information collected to be accessed via SNMP.

Figure 3:
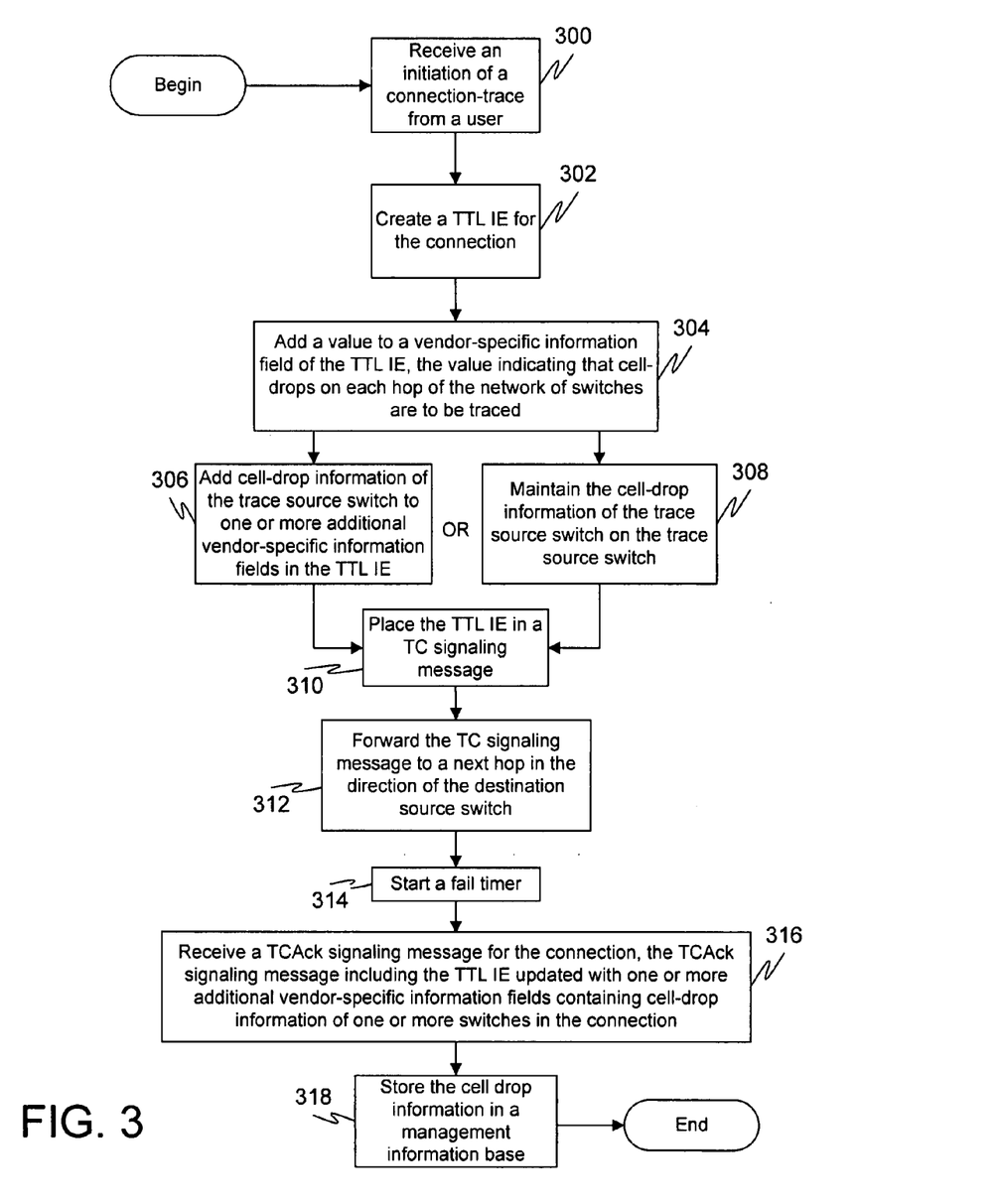
FIG. 3 is a flow diagram illustrating a method followed at a trace-source switch for initiating a connection-trace to automatically retrieve cell-drop information of a connection having a trace destination switch in a network of switches in accordance with a specific embodiment of the present invention.

FIG. 3 is a flow diagram illustrating a method followed at a trace-source switch for initiating a connection-trace to automatically retrieve cell-drop information of a connection having a trace destination switch in a network of switches in accordance with a specific embodiment of the present invention. At 300, an initiation of a connection-trace may be received from a user. At 302, a trace transit list information element (TTL IE) may be created for the connection. At 304, a value may be added to a vendor-specific information field of the TTL IE, the value indicating that cell-drops on each hop of the network of switches are to be traced. At 306, cell-drop information of the trace source switch may be added to one or more additional vendor-specific information fields in the TTL IE. Alternatively, the cell-drop information of the trace source switch may be maintained on the trace source switch at 308. At 310, the TTL IE may be placed in a TC signaling message. At 312, the TC signaling message may be forwarded to a next hop in the direction of the trace destination switch. At 314, a fail timer may be started. At 316, a trace-connection acknowledge (TCAck) signaling message for the connection may be received, the TCAck signaling message including the TTL IE updated with one or more additional vendor-specific information fields containing cell-drop information of one or more switches in the connection. At 318, the cell-drop information may be stored in a management information base.

Figure 4:
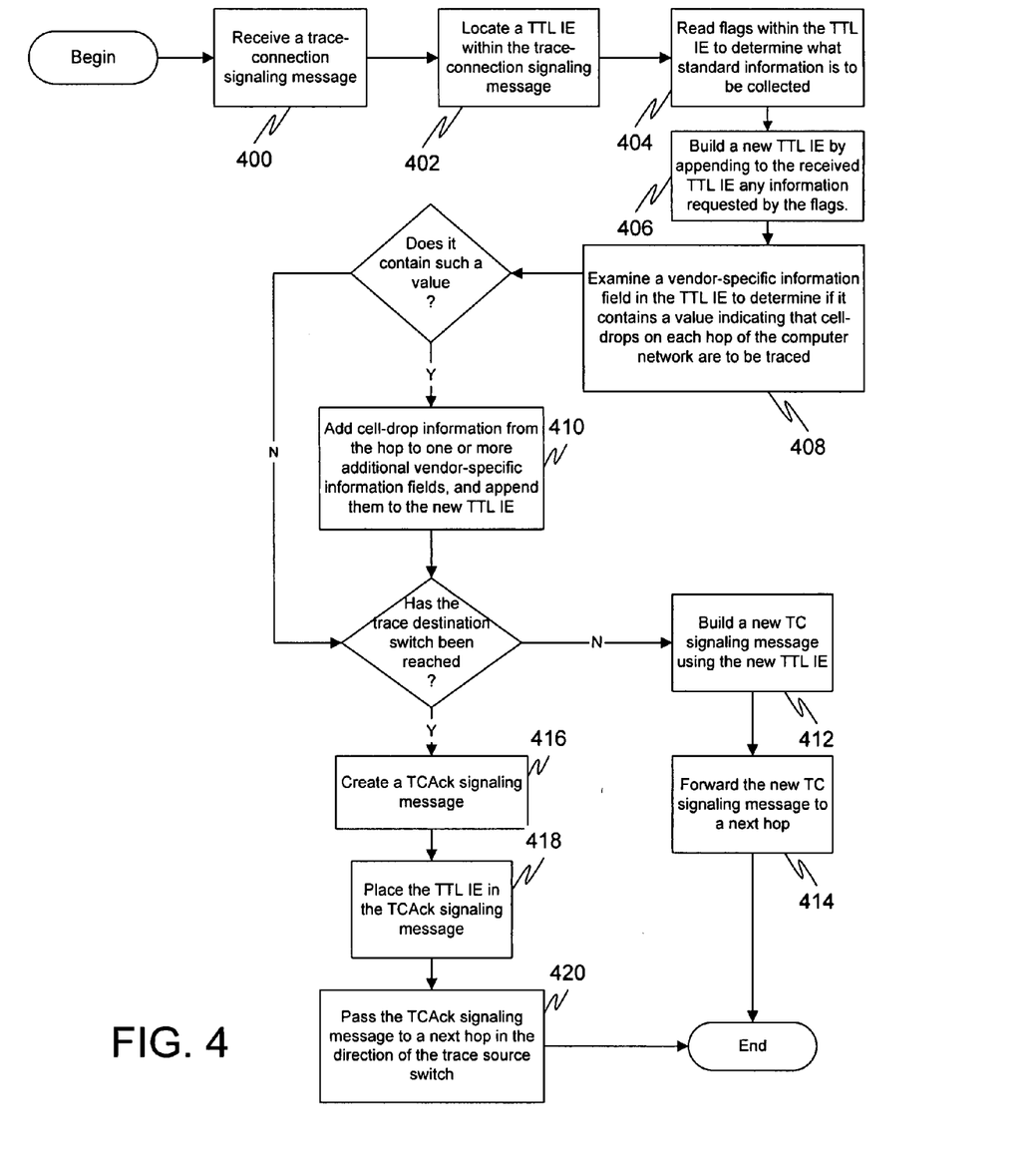
FIG. 4 is a flow diagram illustrating a method for handling an incoming trace connection (TC) signaling message on switches in a path of a connection in a network of switches, the TC signaling message including a trace transit list information element (TTL IE) and having a trace source switch and a trace destination switch, in accordance with an embodiment of the present invention.

FIG. 4 is a flow diagram illustrating a method for handling an incoming trace connection (TC) signaling message on switches in a path of a connection in a network of switches, the TC signaling message including a trace transit list information element (TTL IE) and having a trace source switch and a trace destination switch, in accordance with an embodiment of the present invention. At 400, a trace-connection signaling message may be received. At 402, a TTL IE within the trace-connection signaling message may be located. At 404, flags within the TTL IE may be read to determine what standard information is to be collected. At 406, a new TTL IE may be built by appending to the received TTL IE any information requested by the flags. At 408, a vendor-specific information field in the TTL IE may be examined to determine if it contains a value indicating that cell-drops on each hop of the network of switches are to be traced. At 410, cell-drop information from the hop may be added to one or more additional vendor-specific information fields, and these fields may be appended to the new TTL IE if the vendor specific information field in the TTL IE contains a value indicating that cell-drops on each hop of the network of switches are to be traced. At 412, a new TC signaling message may be built using the new TTL IE and at 414, the new TC signaling message may be forwarded to a next hop in the network of switches in the direction of the trace destination switch unless the trace destination switch has been reached. If the trace destination switch has been reached, then at 416, a trace connection acknowledge (TCAck) signaling message may be created. At 418, the TTL IE may be placed in the TCAck signaling message, and at 420 the TCAck signaling message may be passed to a next hop in the direction of the trace source switch.

Figure 5:
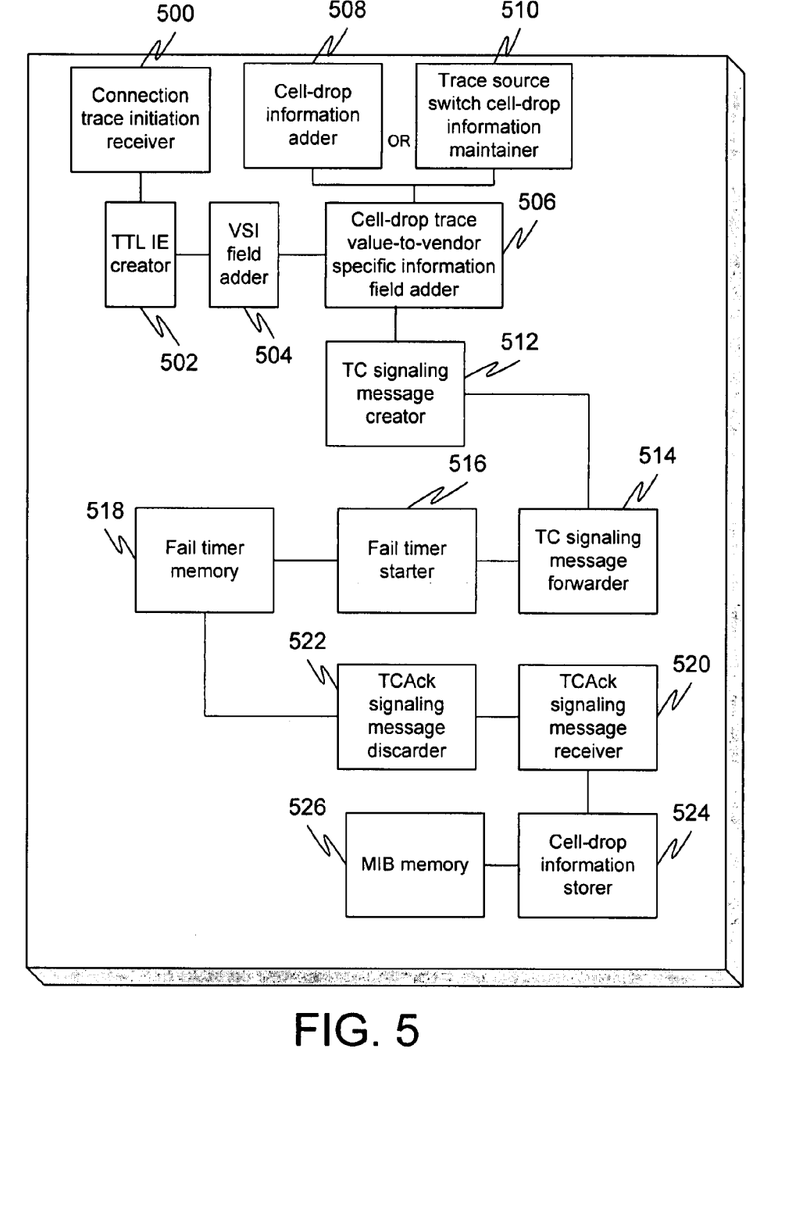
FIG. 5 is a block diagram illustrating an apparatus at a trace-source switch for initiating a connection-trace to automatically retrieve cell-drop information of a connection having a trace destination switch in a network of switches in accordance with a specific embodiment of the present invention.

FIG. 5 is a block diagram illustrating an apparatus at a trace-source switch for initiating a connection-trace to automatically retrieve cell-drop information of a connection having a trace destination switch in a network of switches in accordance with a specific embodiment of the present invention. A connection trace initiation receiver 500 may receive an initiation of a connection-trace from a user. A trace transit list information element (TTL IE) creator 502 coupled to the connection trace initiation receiver 500 may create a trace transit list information element (TTL IE) for the connection. A VSI field inserter 504 coupled to TTL IE creator 502 may insert a VSI field into the TTL IE. A cell-drop trace value-to-vendor specific information field adder 506 coupled to the VSI field inserter 504 may add a value to a vendor-specific information field, the value indicating that cell-drops on each hop of the network of switches are to be traced. A cell-drop information adder 508 coupled to the cell-drop trace value-to-vendor specific information field adder 506 may add cell-drop information of the trace source to one or more additional vendor-specific information fields in the TL IE. Alternatively, a trace source switch cell-drop information maintainer 510 coupled to the cell-drop trace value-to-vendor specific information field adder 508 may maintain the cell-drop information of the trace source switch on the trace source switch. A TC signaling message creator 512 coupled to the cell-drop trace value-to-vendor specific information field adder 506 may place the TTL IE in a TC signaling message.

A TC signaling message forwarder 514 coupled to the TC signaling message creator 512 may forward the TC signaling message to a next hop in the direction of the trace destination switch. A fail timer starter 516 coupled to the TC signaling message forwarder 514 may start a fail timer and store it in a fail timer memory 518. A trace-connection acknowledge (TCAck) signaling message receiver 520 may later receive a TCAck signaling message for the connection, the TCAck signaling message including the TTL IE updated with one or more additional vendor-specific information fields containing cell-drop information of one or more switches in the connection. A TCAck signaling message discarder 522 coupled to the TCAck signaling message receiver 520 and to the fail timer memory 518 may discard the TCAck signaling message if the fail timer has expired. A cell-drop information storer 524 coupled to the TCAck signaling message receiver 520 and to a MIB memory 526 may store the cell-drop information in a management information base.

Figure 6:
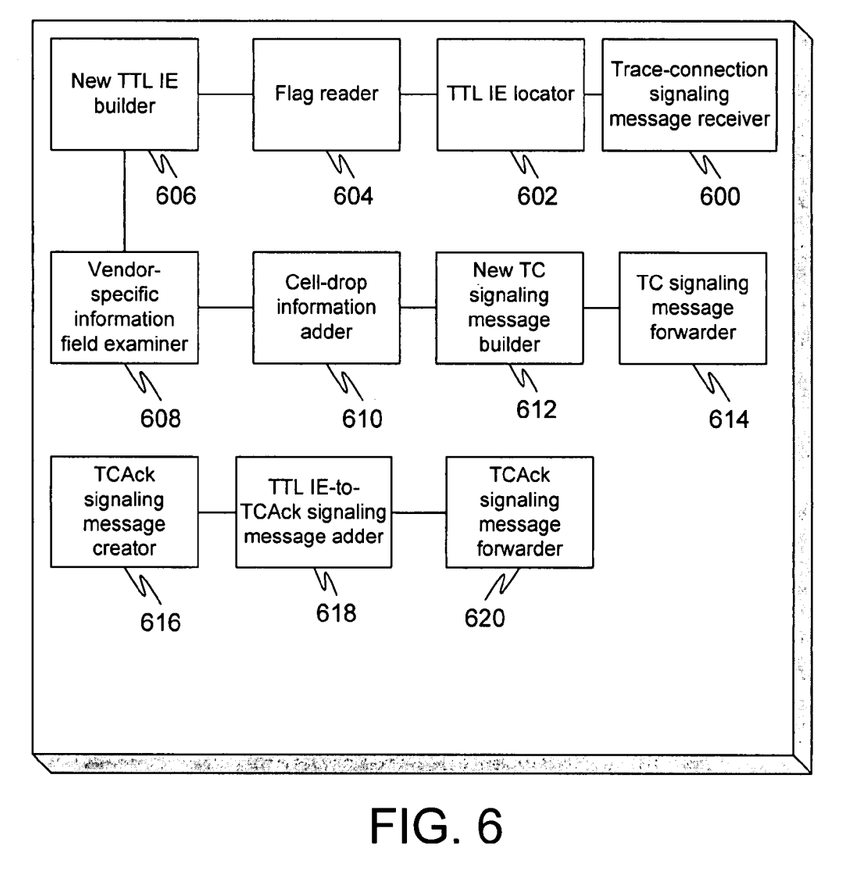
FIG. 6 is a block diagram illustrating an apparatus for handling an incoming trace connection (TC) signaling message on switches in a path of a connection in a network of switches, the TC signaling message including a trace transit list information element (TTL IE) and having a trace source switch and a trace destination switch, in accordance with an embodiment of the present invention.

FIG. 6 is a block diagram illustrating an apparatus for handling an incoming trace connection (TC) signaling message on switches in a path of a connection in a network of switches, the TC signaling message including a trace transit list information element (TTL IE) and having a trace source switch and a trace destination switch, in accordance with an embodiment of the present invention. A trace-connection signaling message receiver 600 may receive a trace-connection signaling message. A TTL IE locator 602 coupled to the trace-connection signaling message receiver 600 may locate a TTL IE within the trace-connection signaling message. A flag reader 604 coupled to the TTL IE locator 602 may read flags within the TTL IE to determine what standard information is to be collected. A new TTL IE builder 606 coupled to the flag reader 604 may build a new TTL IE by appending to the received TTL IE any information requested by the flags. A vendor-specific information field examiner 608 coupled to the new TTL IE builder 606 may examine a vendor-specific information field in the TTL IE to determine if it contains a value indicating that cell-drops on each hop of the network of switches are to be traced.

A cell-drop information adder 610 coupled to the Vendor-specific information field examiner 608 may add cell-drop information from the hop to one or more additional vendor-specific information fields, and append these fields to the new TTL IE if the vendor specific information field in the TTL IE contains a value indicating that cell-drops on each hop of the network of switches are to be traced. A new TC signaling message builder 612 coupled to the cell-drop information adder 610 may build a new TC signaling message using the new TTL IE and at a TC signaling message forwarder 614 coupled to the new TC signaling message builder 612 may forward the new TC signaling message to a next hop in the network of switches in the direction of the trace destination switch unless the trace destination switch has been reached. If the trace destination switch has been reached, then a trace connection acknowledge (TCAck) signaling message creator 616 may create a trace connection acknowledge (TCAck) signaling message. A TTL IE-to-TCAck signaling message adder 618 coupled to the TCAck signaling message creator 616 may add the TTL IE in the TCAck signaling message. A TCAck signaling message forwarder 620 coupled to the TTL IE-to-TCAck signaling message adder 618 may forward the TCAck signaling message to a next hop in the direction of the trace source switch.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for initiating a connection-trace to automatically retrieve cell-drop information of a connection having a trace destination switch in a network of switches, the method comprising:

creating a trace transit list information element (TTL IE) for the connection;

adding a value to a vendor-specific information field of said TTL IE, said value indicating that cell-drops on each hop of the network of switches are to be traced;

placing said TTL IE in a trace connection (TC) signaling message; and forwarding said TC signaling message to a next hop in the direction of the trace destination switch.

2. The method of claim 1, further comprising:

receiving a trace-connection acknowledge (TCAck) signaling message for the connection, said TCAck signaling message including said TTL IE updated with one or more additional vendor-specific information fields containing cell-drop information of one or more switches in the connection; and storing said cell-drop information in a management information base.

3. The method of claim 2, further comprising:

starting a fail timer when said TC signaling message is forwarded; and discarding said TCAck signaling message if said fail timer has expired when said TCAck signaling message is received.

4. The method of claim 1, further comprising:

adding cell-drop information of a trace source switch to one or more additional vendor-specific information fields in the TTL IE.

5. The method of claim 1, further comprising:

maintaining cell-drop information of a trace source switch on said trace source switch.

6. A method for handling a trace connection (TC) signaling message on a hop in a network of switches, the TC signaling message including a trace transit list information element (TTL IE) and having a trace source switch and a trace destination switch, the method comprising:

examining a vendor-specific information field in the TTL IE to determine if it contains a value indicating that cell-drops on each hop of the network of switches are to be traced;

adding cell-drop information from the hop to one or more additional vendor-specific information fields if said vendor specific information field in the TTL IE contains a value indicating that cell-drops on each hop of the network of switches are to be traced;

appending said additional vendor-specific information fields to the TTL IE;

building a new TC signaling message using the TTL IE; and forwarding said new TC signaling message to a next hop in the network of switches in the direction of the trace destination switch unless said trace destination switch has been reached.

7. The method of claim 6, further comprising the following if said trace destination switch has been reached:
creating a trace connection acknowledge (TCAck) signaling message;
placing said TTL IE in said TCAck message; and
forwarding said TCAck signaling message to a next hop in the direction of the trace source switch.

8. A method for running a connection trace on a connection in a network of switches, the connection having a trace source switch and a trace destination switch, the method comprising:
creating a trace transit list information element (TTL IE) for the connection on the trace source switch;
adding a value to a first vendor-specific information field of said TTL IE, said value indicating that cell-drops on each hop of the network of switches are to be traced on the trace source switch;
placing said TTL IE in a trace connection (TC) signaling message on the trace source switch;
forwarding said TC signaling message to a next hop in the direction of the trace destination switch;
examining a vendor-specific information field in the TTL IE to determine if it contains a value indicating that cell-drops on each hop of the network of switches are to be traced;
adding cell-drop information from the hop to one or more additional vendor-specific information fields if said vendor specific information field in the TTL IE contains a value indicating that cell-drops on each hop of the network of switches are to be traced;
appending said additional vendor-specific information fields to the TTL IE;
building a new TC signaling message using the TTL IE;
forwarding said new TC signaling message to a next hop in the network of switches in the direction of the trace destination switch unless said trace destination switch has been reached; and
repeating said examining, adding cell-drop information, appending, building a new TC signaling message, and forwarding said new TC signaling message unless said trace destination switch has been reached.

9. The method of claim 8, further comprising the following if said trace destination switch has been reached:
creating a trace connection acknowledge (TCAck) signaling message;
placing said TTL IE in said TCAck message; and
forwarding said TCAck signaling message to a next hop in the direction of the trace source switch.

10. The method of claim 9, further comprising:
receiving a trace-connection acknowledge (TCAck) signaling message for the connection at the trace source switch, said TCAck signaling message including said TTL IE updated with one or more additional vendor-specific information fields containing cell-drop information of one or more switches in the connection; and
storing said cell-drop information in a management information base at the trace source switch.

11. The method of claim 10, further comprising:
starting a fail timer at the trace source switch when said TC signaling message is forwarded; and
discarding said TCAck signaling message if said fail timer has expired when said TCAck signaling message is received by the trace source switch.

12. The method of claim 8, further comprising:
adding cell-drop information of a trace source switch to one or more additional vendor-specific information fields in the TTL IE.

13. The method of claim 8, further comprising:
maintaining cell-drop information of a trace source switch on said trace source switch.

14. An apparatus for initiating a connection-trace to automatically retrieve cell-drop information of a connection having a trace destination switch in a network of switches, the apparatus comprising:
a trace transit list information element (TTL IE) creator;
a cell-drop tracer value-to-vendor specific information field adder coupled to said TTL IE creator;
a trace-connection (TC) signaling message creator coupled to said cell-drop tracer value-to-vendor specific information field adder; and
a TC signaling message forwarder coupled to said TC signaling message creator.

15. The apparatus of claim 14, further comprising:
a trace-connection acknowledge (TCAck) signaling message receiver; and
a cell-drop information storer coupled to said TCAck signaling message receiver and to a memory having a management information base.

16. The apparatus of claim 15, further comprising:
a fail timer starter coupled to said TC signaling message forwarder and to a memory having a fail timer; and
a TCAck signaling message discarder coupled to said TCAck signaling message receiver and to said memory having a fail timer.

17. The apparatus of claim 14, further comprising a cell-drop information adder coupled to said TTL IE-to-TC signaling message inserter.

18. The apparatus of claim 14, further comprising a trace source switch cell-drop information maintainer coupled to said TTL IE-to-TC signaling message inserter.

19. An apparatus for handling a trace connection (TC) signaling message on a hop in a network of switches, the TC signaling message including a trace transit list information element (TTL IE) and having a trace source switch and a trace destination switch, the apparatus comprising:
a vendor-specific information field examiner;
a cell-drop information adder coupled to said vendor-specific information field examiner;
a new TC signaling message builder coupled to the cell-drop information adder; and
a TC signaling message forwarder coupled to said new TC signaling message builder.

20. The apparatus of claim 19, further comprising the following if said apparatus is located on said trace destination switch:
a trace connection acknowledge (TCAck) signaling message creator;
a TTL IE to TCAck signaling message adder coupled to said TCAck signaling message creator; and
a TCAck signaling message forwarder coupled to said TTL IE to TCAck signaling message adder.

21. A system for running a connection trace on a connection in a network of switches, the connection having a trace source switch and a trace destination switch, the system comprising:
an apparatus on said trace source switch including:
a trace transit list information element (TTL IE) creator;
a cell-drop tracer value-to-vendor specific information field adder coupled to said TTL EE creator;

a trace-connection (TC) signaling message creator coupled to said cell-drop tracer value-to-vendor specific information field adder; and a TC signaling message forwarder coupled to said TC signaling message creator;

an apparatus on one or more hops in said connection including:

a vendor-specific information field examiner;

a cell-drop information adder coupled to said vendor-specific information field examiner;

a new TC signaling message builder coupled to the cell-drop information adder; and a TC signaling message forwarder coupled to said new TC signaling message builder.

22. The system of claim 21, further comprising an apparatus on said trace destination switch including:

a vendor-specific information field examiner;

a cell-drop information adder coupled to said vendor-specific information field examiner;

a trace connection acknowledge (TCAck) signaling message creator coupled to said cell-drop information adder;

a TTL IE to TCAck signaling message adder coupled to said TCAck signaling message creator; and a TCAck signaling message forwarder coupled to said TTL IE to TCAck signaling message adder.

23. The system of claim 21, wherein said apparatus on said trace source switch further comprises:

a trace-connection acknowledge (TCAck) signaling message receiver; and a cell-drop information storer coupled to said TCAck signaling message receiver and to a memory having a management information base.

24. The system of claim 23, wherein said apparatus on said trace source switch further comprises:

a fail timer starter coupled to said TC signaling message forwarder and to a memory having a fail timer; and a TCAck signaling message discarder coupled to said TCAck signaling message receiver and to said memory having a fail timer.

25. The system of claim 21, wherein said apparatus on said trace source switch further comprises a cell-drop information adder coupled to said TTL IE-to-TC signaling message inserter.

26. The system of claim 21, wherein said apparatus on said trace source switch further comprises a trace source switch cell-drop information maintainer coupled to said TTL IE-to-TC signaling message inserter.

27. An apparatus for initiating a connection-trace to automatically retrieve cell-drop information of a connection having a trace destination switch in a network of switches, the apparatus comprising:

means for creating a trace transit list information element (TTL IE) for the connection;

means for adding a value to a vendor-specific information field of said TTL IE, said value indicating that cell-drops on each hop of the network of switches are to be traced;

means for placing said TTL IE in a trace connection (TC) signaling message; and means for forwarding said TC signaling message to a next hop in the direction of the trace destination switch.

28. The apparatus of claim 27, further comprising:

means for receiving a trace-connection acknowledge (TCAck) signaling message for the connection, said TCAck signaling message including said TTL IE updated with one or more additional vendor-specific information fields containing cell-drop information of one or more switches in the connection; and means for storing said cell-drop information in a management information base.

29. The apparatus of claim 28, further comprising:

means for starting a fail timer when said TC signaling message is forwarded; and means for discarding said TCAck signaling message if said fail timer has expired when said TCAck signaling message is received.

30. The apparatus of claim 27, further comprising:

means for adding cell-drop information of a trace source switch to one or more additional vendor-specific information fields in the TTL IE.

31. The apparatus of claim 27, further comprising:

means for maintaining cell-drop information of a trace source switch on said trace source switch.

32. An apparatus for handling a trace connection (TC) signaling message on a hop in a network of switches, the TC signaling message including a trace transit list information element (TTL IE) and having a trace source switch and a trace destination switch, the apparatus comprising:

means for examining a vendor-specific information field in the TTL IE to determine if it contains a value indicating that cell-drops on each hop of the network of switches are to be traced;

means for adding cell-drop information from the hop to one or more additional vendor-specific information fields if said vendor specific information field in the TTL IE contains a value indicating that cell-drops on each hop of the network of switches are to be traced;

means for appending said additional vendor-specific information fields to the TTL IE;

means for building a new TC signaling message using the TTL IE; and means for forwarding said new TC signaling message to a next hop in the network of switches in the direction of the trace destination switch unless said trace destination switch has been reached.

33. The apparatus of claim 32, further comprising the following if said trace destination switch has been reached:

means for creating a trace connection acknowledge (TCAck) signaling message;

means for placing said TTL IE in said TCAck message; and means for forwarding said TCAck signaling message to a next hop in the direction of the trace source switch.

34. An apparatus for running a connection trace on a connection in a network of switches, the connection having a trace source switch and a trace destination switch, the apparatus comprising:

means for creating a trace transit list information element (TTL IE) for the connection on the trace source switch;

means for adding a value to a first vendor-specific information field of said TTL IE, said value indicating that cell-drops on each hop of the network of switches are to be traced on the trace source switch;

means for placing said TTL IE in a TC signaling message on the trace source switch;

means for forwarding said TC signaling message to a next hop in the direction of the trace destination switch;

means for examining a vendor-specific information field in the TTL IE to determine if it contains a value indicating that cell-drops on each hop of the network of switches are to be traced;

means for adding cell-drop information from the hop to one or more additional vendor-specific information fields if said vendor specific information field in the TTL IE contains a value indicating that cell-drops on each hop of the network of switches are to be traced;

means for appending said additional vendor-specific information fields to the TTL IE;

means for building a new trace connection (TC) signaling message using the TTL IE;

means for forwarding said new TC signaling message to a next hop in the network of switches in the direction of the trace destination switch unless said trace destination switch has been reached; and means for repeating said examining, adding cell-drop information, appending, building a new TC signaling message, and forwarding said new TC signaling message unless said trace destination switch has been reached.

35. The apparatus of claim 34, further comprising the following if said trace destination switch has been reached:

means for creating a trace connection acknowledge (TCAck) signaling message;

means for placing said TTL IE in said TCAck message; and means for forwarding said TCAck signaling message to a next hop in the direction of the trace source switch.

36. The apparatus of claim 35, further comprising:

means for receiving a trace-connection acknowledge (TCAck) signaling message for the connection at the trace source switch, said TCAck signaling message including said TTL IE updated with one or more additional vendor-specific information fields containing cell-drop information of one or more switches in the connection; and means for storing said cell-drop information in a management information base at the trace source switch.

37. The apparatus of claim 36, further comprising:

means for starting a fail timer at the trace source switch when said TC signaling message is forwarded; and means for discarding said TCAck signaling message if said fail timer has expired when said TCAck signaling message is received by the trace source switch.

38. The apparatus of claim 34, further comprising:

means for adding cell-drop information of a trace source switch to one or more additional vendor-specific information fields in the TTL IE.

39. The apparatus of claim 34, further comprising:

means for maintaining cell-drop information of a trace source switch on said trace source switch.

40. A program storage device readable by a machine, tangibly embodying a program of instructions executable by the machine to perform a method for initiating a connection-trace to automatically retrieve cell-drop information of a connection having a trace destination switch in a network of switches, the method comprising:

creating a trace transit list information element (TTL IE) for the connection;

adding a value to a vendor-specific information field of said TTL IE, said value indicating that cell-drops on each hop of the network of switches are to be traced;

placing said TTL IE in a trace connection (TC) signaling message; and forwarding said TC signaling message to a next hop in the direction of the trace destination switch.

41. The program storage device of claim 40, wherein the method further comprises:

receiving a trace-connection acknowledge (TCAck) signaling message for the connection, said TCAck signaling message including said TTL IE updated with one or more additional vendor-specific information fields containing cell-drop information of one or more switches in the connection; and storing said cell-drop information in a management information base.

42. The program storage device of claim 41, wherein the method further comprises:

starting a fail timer when said TC signaling message is forwarded; and discarding said TCAck signaling message if said fail timer has expired when said TCAck signaling message is received.

43. The program storage device of claim 40, wherein the method further comprises:

adding cell-drop information of a trace source switch to one or more additional vendor-specific information fields in the TTL IE.

44. The program storage device of claim 40, wherein the method further comprises:

maintaining cell-drop information of a trace source switch on said trace source switch.

45. A program storage device readable by a machine, tangibly embodying a program of instructions executable by the machine to perform a method for handling a trace connection (TC) signaling message on a hop in a network of switches, the TC signaling message including a trace transit list information element (TTL IE) and having a trace source switch and a trace destination switch, the method comprising:

examining a vendor-specific information field in the TTL IE to determine if it contains a value indicating that cell-drops on each hop of the network of switches are to be traced;

adding cell-drop information from the hop to one or more additional vendor-specific information fields if said vendor specific information field in the TTL IE contains a value indicating that cell-drops on each hop of the network of switches are to be traced;

appending said additional vendor-specific information fields to the TTL IE;

building a new TC signaling message using the TTL IE; and forwarding said new TC signaling message to a next hop in the network of switches in the direction of the trace destination switch unless said trace destination switch has been reached.

46. The program storage device of claim 45, wherein the method further comprises the following if said trace destination switch has been reached:

creating a trace connection acknowledge (TCAck) signaling message;

placing said TTL IE in said TCAck message; and forwarding said TCAck signaling message to a next hop in the direction of the trace source switch.

47. A program storage device readable by a machine, tangibly embodying a program of instructions executable by the machine to perform a method for running a connection trace on a connection in a network of switches, the connection having a trace source switch and a trace destination switch, the method comprising:

creating a trace transit list information element (TTL IE) for the connection on the trace source switch;

adding a value to a first vendor-specific information field of said TTL IE, said value indicating that cell-drops on each hop of the network of switches are to be traced on the trace source switch;

placing said TTL IE in a TC signaling message on the trace source switch;

forwarding said TC signaling message to a next hop in the direction of the trace destination switch;

examining a vendor-specific information field in the TTL IE to determine if it contains a value indicating that cell-drops on each hop of the network of switches are to be traced;

adding cell-drop information from the hop to one or more additional vendor-specific information fields if said vendor specific information field in the TTL IE contains a value indicating that cell-drops on each hop of the network of switches are to be traced;

appending said additional vendor-specific information fields to the TTL IE;

building a new TC signaling message using the TTL IE;

forwarding said new TC signaling message to a next hop in the network of switches in the direction of the trace destination switch unless said trace destination switch has been reached; and repeating said examining, adding cell-drop information, appending, building a new TC signaling message, and forwarding said new TC signaling message unless said trace destination switch has been reached.

48. The program storage device of claim 47, wherein the method further comprises the following if said trace destination switch has been reached:

creating a trace connection acknowledge (TCAck) signaling message;

placing said TTL IE in said TCAck message; and forwarding said TCAck signaling message to a next hop in the direction of the trace source switch.

49. The program storage device of claim 48, wherein the method further comprises:

receiving a trace-connection acknowledge (TCAck) signaling message for the connection at the trace source switch, said TCAck signaling message including said TTL IE updated with one or more additional vendor-specific information fields containing cell-drop information of one or more switches in the connection; and storing said cell-drop information in a management information base at the trace source switch.

50. The program storage device of claim 49, wherein the method further comprises:

starting a fail timer at the trace source switch when said TC signaling message is forwarded; and discarding said TCAck signaling message if said fail timer has expired when said TCAck signaling message is received by the trace source switch.

51. The program storage device of claim 47, wherein the method further comprises:

adding cell-drop information of a trace source switch to one or more additional vendor-specific information fields in the TTL IE.

52. The program storage device of claim 47, wherein the method further comprises:

maintaining cell-drop information of a trace source switch on said trace source switch.

\* \* \* \* \*